United States Patent Office 3,369,007
Patented Feb. 13, 1968

3,369,007
MOLECULAR SIEVING AGENT CONSISTING OF MAINLY BALL SHAPED GEL GRAINS AND A METHOD FOR THEIR MANUFACTURE
Per Gustaf Magnus Flodin, Perstorp, Sweden, assignor to Aktiebolaget Pharmacia, a company of Sweden
No Drawing. Filed Sept. 24, 1963, Ser. No. 311,216
9 Claims. (Cl. 260—80.3)

The present invention relates to a novel molecular sieving agent comprising a high molecular weight hydrophilic copolymerisate of an alkylidene-bisacrylamide with a substance containing an ethylenic double bond, preferably acrylamide, and a method for the manufacture of this copolymerisate.

It is known that hydrophilic copolymerisates of alkylidene-bisacrylamides having the formula:

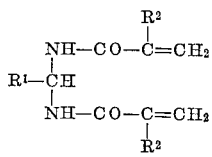

in which

stands for the hydrocarbon residue of an aldehyde and $R^2$ stands for methyl or hydrogen, can be produced by reacting the alkylidene-bisacrylamide with a compound containing an ethylene group, i.e. a compound containing the group

in the presence of catalysts.

As residues of an aldehyde may primarily be mentioned the methylene group, but the ethylidene group etc. may also come in question.

As compounds containing an ethylene group may, for example, be mentioned acrylamide, acrylic acid, methacrylic acid, crotonic acid, itaconic acid, citroconic acid, maleic acid, maleic anhydride, methylenebisacrylamide, and other N-substituted acrylamides and similar compounds. The acrylamide is the preferred substance used according to the invention.

The polymerization of the alkylidenebisacrylamide with the ethylene group-containing compound is catalyzed by ions of metals capable of occurring in different valency stages, for example copper, iron and tin. However, oxygen-containing catalysts, such as water-soluble peracids and their salts, such as ammonium, potassium and sodium persulphates; hydrogen peroxide; chlorates of ammonium and alkali metals and similar may also be used preferably in combination with metal-ion catalysts.

The content of alkylidenebisacrylamide is usually between 0.5 and 20 percent, preferably between 3 and 10 percent, based on the total amount of polymerizable compounds.

It has previously been found that grains of the above copolymerisates when swollen in water or a similar liquid, may be used for so-called gel filtration. The technique of this filtration is described in the U.S. Patent No. 3,002,823.

This technique broadly comprises first feeding an aqueous solution of substances of different molecular weight to a bed of gel grains, the bed of gel grains being previously immersed in an aqueous medium. The gel grains consist of a mainly uncharged water-insoluble organic material which is inert with regard to the substances to be separated and capable of swelling in aqueous medium, the said gel being capable of selectively and/or preferentially sorbing substances from the solution so that substances with different molecular weights are distributed differently between the gel grains and the surrounding solution owing to their different ability to penetrate into the gel grains, which is in turn dependent upon their molecular weights. The aqueous medium in which the gel grains are immersed is displaced from the gel bed by the said aqueous solution of different substances and thereafter aqueous liquid ("elution" liquid) is fed to the bed to displace the said aqueous solution from the bed, and successive fractions of the displaced liquid (the effluent) flowing out from the bed are collected, whereby there is obtained at least one fraction which contains a major portion of substance of larger molecular size, and at least one subsequent fraction containing a major portion of the substance of smaller molecular size.

The separating capacity of the gel grains is on the one hand dependent on the molecular weight of the substances to be separated and, on the other hand, on the size of the pores or meshes in the three-dimensional network of the gel product. Substances present in the aqueous solution, the molecular weight of which are too large to allow a penetration into the gel grains remain in the solution and pass through the bed outside the gel grains and are collected in the first fraction or fractions, while substances of sufficiently small molecular weight to allow a penetration into the gel grains are temporarily taken up by the grains, thus enabling a separation from the molecules of greater weight and are then recovered in a subsequent fraction.

It has now been found that ball shaped grains of the above copolymerisates in grain form when packed in a column or bed will offer a much lower flow resistance to liquid. This will in turn be of value for the separation of mixtures of sensitive substances which will rapidly undergo chemical changes. The relatively low flow resistance can also be taken advantage of by use of relatively fine particles, thereby increasing the efficiency of separation.

On the basis hereof, the present invention concerns a molecular seiving agent consisting of grains comprising the above mentioned copolymerisates.

The invention also relates to a process for the manufacture of ball shaped or rounded grains of the copolymerisate preferably to be used as molecular sieving agents.

The present invention especially concerns the manufacture of high molecular weight hydrophilic copolymerisates of the type as set forth above in gel grain form, in the presence of one or more catalysts, and what characterizes the invention is that a solution of the ethylene group-containing substance and of the alkylidenebisacrylamide is admixed with a liquid capable of forming a two-phase system therewith, under sufficient agitation conditions to distribute the solution in the form of drops within the liquid, whereupon the polymerization is caused to proceed at least until cross-linking of sufficiently high degree to effect gelatinizing of the drops has been obtained.

One advantage of this process is that it yeilds grains of the copolymerisate directly. It will thus not be necessary to carry out a subsequent disintegration process, and the grains will be obtained in a form which will render them suitable for sieving, if a special fraction is desired to be extracted.

The very manner of causing the reaction to take place is not critical. The factors determining the speed at which the reaction will proceed are the nature of the unsaturated compounds present, the type of catalyst and the temperature of the reaction system.

An advisable manner of carrying the invention into practice is first to form a solution, preferably an aqueous solution of the substances to be copolymerized, i.e. the alkylidene-bisacrylamide and the ethylene group-containing substances, whereupon, possibly after adjusting the pH thereof, the catalyst is added to the solution obtained, and the latter is then dispersed into a solvent not completely miscible therewith.

Under these mixing operations the reaction speed of the copolymerization is not so high as to cause gelation to take place. After forming the two-phase system, the reaction temperature will advisably be increased to augment the reaction speed, thereby causing gelation to take place.

The essential feature of the invention is thus that the suspended drops of the solution, containing the ethylene group-containing substance (acrylamide) and alkylidene-bisacrylamide, is caused to gelatinize while being surrounded by solvent preventing them from adhering to each other or caking.

The concentration of alklidenebisacrylamide of the solution to be suspended into drops is of great importance in that it determines the cross-linking degree of the copolymerisate obtained and accordingly the swellability in water or other comparable liquid. A low concentration of the alkylidenebisacrylamide will result in a higher swellability than a higher concentration thereof. With respect to methylenebisacrylamide, the concentration may be in the range of from 5 to 70 percent, optimum results being obtained with concentration in the range from 10 to 50, inclusive, percent.

The form the continuous phase of the two-phase system may be used liquids not completely miscible with water or the substances comparable therewith used as a solvent for the alkylidenebisacrylamide. The expression "liquid not completely miscible" means that a relatively high degree of mutual miscibility can be permitted between the solvents of the two-phase system. Preferably solvent-systems are, however, used in which the mutual miscibility under the reaction conditions is none or relatively small. Suitable solvents in combination with water are aliphatic and aromatic hydrocarbons, halogenated aliphatic and aromatic hydrocarbons such as 1.2-dichloro-ethane, 1.2-dibromoethane, and o-dichlorobenzene.

According to the invention it is advisable to add a stabilizing agent to the system to stabilize the dispersion of the solution of monomers. As stabilizing agents may be mentioned polymers insoluble in water, such as polyvinylacetate, polystyrene, polyisobutylene and celluloseacetatebutyrate. It has proved that the average molecular weight of the polymers is of considerable importance for their action as stabilizing agents, in that products having a higher molecular weight will act more effectively stabilizing on the dispersion than a product having a lower average molecular weight under conditions similar for the rest. It is proper to relate the amount of stabilizing agent to the content of that solvent which is the continuous phase. Suitable contents of the stabilizing agent are in the range from 0.1 to 15, inclusive, percent, preferably from 0.1 to 10, inclusive, percent (weight per volume).

The stabilizing agent is removed from the gel grains formed by treating the latter with a suitable solvent. With respect to high polymers capable of undergoing hydrolysis under relatively mild conditions, it will be advisable first to treat the gel grains with a hydrolyzing agent, such as alkalimetalhydroxide, and then remove the products of hydrolysis by means of a solvent. High molecular weight esters, such as polyvinylacetate and celluloseacetatebutyrate, may be treated with a dilute aqueous solution of alkalimetalhydroxide to saponification of the esters, whereupon the high molecular weight alcohols formed are removed by washing the grains with a solvent therefor.

Under certain conditions it may be advisable to add a surface-active agent of the type detergent to the reaction mixture. Such agents do not function as suspension stabilizing agents but may be used in combination with such agents to attain special effects, such as smaller grain sizes of the copolymerisate formed.

The agitation conditions are especially important under the first period of the copolymerization process, in that they together with the stabilizing agent determine the grain sizes of the dispersed phase composed of liquid drops. In this connection, by examining of samples taken out at different agitation speeds, the skilled person will be capable of determining the agitation speed most suitable to attain the desired result.

When a suitable drop size distribution has been obtained, it will frequently be advisable to increase the temperature in order to initiate the reaction. Depending on the contents of alkylidenebisacrylamide and ethylene group-containing substance, and the temperature, etc., gelation will take place at a certain time. It will, however, be advisable to cause the reaction to proceed until the monomers have been completely consumed or the reaction has been finished. After the gelation has taken place, the agitation will be of no essential importance for the grain sizes of the copolymerisates.

The reaction temperature will determine the rate at which the copolymerisation takes place. Suitable temperatures are in the range of between room temperature and 90° C., preferably in the range from 20 to 60° C.

The property of the copolymerisate primarily determining whether, or not, it is suitable to use as a molecule sieve is the water absorbing ability of the gel (water regain). The latter is determined by swelling the water-free products in water and removing the free liquid, for example by centrifugation, and is stated as the number of grams of water absorbed by one gram of dry substance. The water regain for the gel grains prepared according to the invention may be within the range of from about 1 to 50 g./g. of the dry gel product, but is generally within the range of about 1.0 to 20 g./g. of the dry gel product.

The following example shows a way in which the invention has been practiced.

*Example*

10 g. of a mixture of 95 percent acrylamide and 5 percent of N,N'-methylenediacrylamide were dissolved in 90 ml. of an aqueous 0.1 M solution of sodium acetate having a pH of 4. To the solution was added 1.2 g. of ammoniumpersulphate as a catalyst. The catalyst-containing solution was placed in a cylindrical reaction vessel provided with a stirrer and a thermometer. As a suspension stabilizing agent were added 8 g. of celluloseacetatebutyrate dissolved in 200 ml. of ethylenedichloride. The stirrer was put in operation and adjusted to a speed sufficient to disperse the aqueous phase into small drops within the ethylenedichloride-phase. The reaction mixture was simultaneously heated to 50° C. for 2 hours while passing nitrogen gas through it. In the meantime the drops were converted into gel grains.

After another 4 hours the agitation of the two-phase system was finished and the beads of copolymerisate were purified by dispersing them in an excess of acetone. The product was then permitted to swell in water, washed with water, shrunk with acetone and dried under vacuum at 70°. The yield was 10 g. of a product having a water regain amounting to 8.5 g. per g. of dry substance. The size distribution of the product was determined by sieving with the following result:

| Mesh: | Grams |
| --- | --- |
| 50–100 | 2.5 |
| 100–200 | 5.5 |
| 200–400 | 1.6 |
| 400 | 0.5 |

What I claim is:

1. A molecular sieving agent, consisting essentially of beaded gel grains comprising a high molecular weight hydrophilic copolymerizate of alkylidene-bis-acrylamide having the formula

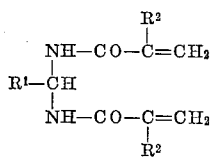

in which $R^1$ is a member selected from the group consisting of hydrogen and methyl, and $R^2$ is a member selected from the group consisting of methyl and hydrogen, with a substance having an ethylenic double bond, said copolymerizate having a water regain in the range of from 1 to 50 grains per gram of the dry substance.

2. A molecular sieving agent, as claimed in claim 1, wherein the substance having an ethylenic double bond is acrylamide.

3. A molecular sieving bed comprising the beaded particles of claim 1.

4. A molecular sieving agent according to claim 1 wherein said copolymerizate has a water regain in the range from 1 to 20 grains per gram of the dry substance.

5. A molecular sieving agent according to claim 1 wherein said beaded gel grains have a size distribution within the range of between about 50–400 mesh.

6. The method which comprises:
 (a) feeding an aqueous solution of substances of different molecular weight to a bed of gel grains,
 (b) the bed of gel grains having been previously immersed in an aqueous medium,
 (c) said gel being capable of swelling in aqueous medium and being capable of selectively sorbing substances from said solution so that said substances with different molecular weights are distributed differently between the gel grains and the surrounding solution owing to their different ability to penetrate into said gel grains,
 (d) displacing aqueous solution in which the gel grains are immersed by said aqueous solution of different substances,
 (e) thereafter feeding aqueous elution liquid to the bed to displace the said aqueous solution from said bed,
 (f) collecting successive fractions of the displaced liquid flowing out from the bed to thereby obtain at least one fraction which contains a major portion of substance of larger molecular size and at least one subsequent fraction containing a major portion of the substance of smaller molecular size,
 (g) said bed of gel grains consisting essentially of gel grains in bead form comprising a high molecular weight hydrophilic copolymerizate of alkylidene-bis-acrylamide having the formula:

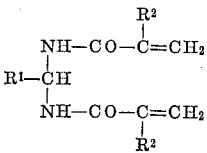

in which $R^1$ is a member selected from the group consisting of hydrogen and methyl, and $R^2$ is a member selected from the group consisting of methyl and hydrogen, with a substance having an ethylenic double bond, said copolymerizate having a water regain in the range of from 1 to 50 grains per gram of the dry substance.

7. The method set forth in claim 6 wherein the substance having an ethylenic double bond is acrylamide.

8. The method according to claim 6 wherein said copolymerizate has a water regain in the range from 1 to 20 grains per gram of the dry substance.

9. The method according to claim 6 wherein said beaded gel grains have a size distribution within the range of between about 50–400 mesh.

References Cited

UNITED STATES PATENTS 3,200,098   8/1965   Goren.

FOREIGN PATENTS 843,374   8/1960   Great Britain.

OTHER REFERENCES

White: J. Phys. Chem., 64, 1563–5 (1960), (copy in Scientific Library, QD1J9).

JOSEPH L. SCHOFER, Primary Examiner.

S. M. LEVIN, Assistant Examiner.